(12) United States Patent
Dudeck

(10) Patent No.: US 10,082,448 B2
(45) Date of Patent: Sep. 25, 2018

(54) ARRANGEMENT, TEST RIG AND METHOD FOR TESTING A SWITCH MECHANISM FOR CHANGING OVER THE PATH TRAVELED BY A RAIL VEHICLE ON A TRACK

(71) Applicant: Siemens Aktiengesellschaft, München (DE)

(72) Inventor: Sven Gerhard Dudeck, München (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 15/121,089

(22) PCT Filed: Mar. 17, 2015

(86) PCT No.: PCT/EP2015/055545
§ 371 (c)(1),
(2) Date: Aug. 24, 2016

(87) PCT Pub. No.: WO2015/154953
PCT Pub. Date: Oct. 15, 2015

(65) Prior Publication Data
US 2016/0363511 A1    Dec. 15, 2016

(30) Foreign Application Priority Data

Apr. 8, 2014 (DE) .......... 10 2014 206 784
Apr. 17, 2014 (DE) .......... 10 2014 207 457

(51) Int. Cl.
*G01N 3/08*     (2006.01)
*G01M 99/00*   (2011.01)
(Continued)

(52) U.S. Cl.
CPC ............. *G01M 99/007* (2013.01); *B61L 5/00* (2013.01); *B61L 27/0055* (2013.01); *E01B 7/00* (2013.01); *G01M 15/02* (2013.01); *G01M 17/08* (2013.01)

(58) Field of Classification Search
CPC ...... G01M 13/00; G01M 15/02; G01M 17/08; G01M 99/00; B61L 5/00; B61L 5/06; B61L 27/0055; E01B 7/00; G01N 3/08
(Continued)

(56) References Cited

U.S. PATENT DOCUMENTS 3,913,492 A * 10/1975 Dull .................. B61B 13/08
                                                    104/130.03
4,284,010 A * 8/1981 Marshall ................ B60L 13/00
                                                    104/171
(Continued)

FOREIGN PATENT DOCUMENTS

CN    101788643 A    7/2010
CN    102348542 A    2/2012
(Continued)

OTHER PUBLICATIONS

Spindler et al.: Mess-Verstelleinheiten Katalog SH 240; pp. 12,13 41-43, 45, 53. 108, 133; 1980.
(Continued)

*Primary Examiner* — Jonathan Dunlap
*Assistant Examiner* — Octavia Hollington
(74) *Attorney, Agent, or Firm* — Schmeiser Olsen & Watts LLP

(57) ABSTRACT

A switch mechanism serves for changing over the path traveled by a rail vehicle on a track. The switch mechanism has an electric motor, the rotational movement of which is converted into a linear movement by way of a spindle rod or toothed rack. Part of the mechanical system is usually also (Continued)

a coupling, which prevents excessive force from being exerted on the track. A flexible adaptation for the test slider of a switch drive enables complete testing of the switch drive on a test bench. The switch drive can be tested in the final state because the test slider does not need to first be removed and then reinstalled only after testing. Separate testing of the test slider in terms of its function and its high voltage strength is therefore no longer necessary. After the testing, no additional steps need to be carried out on the switch drive.

14 Claims, 8 Drawing Sheets

(51) Int. Cl.
  *B61L 5/00* (2006.01)
  *B61L 27/00* (2006.01)
  *G01M 17/08* (2006.01)
  *G01M 15/02* (2006.01)
  *E01B 7/00* (2006.01)
(58) Field of Classification Search
  USPC .................................................. 73/788
  See application file for complete search history.

(56) References Cited

U.S. PATENT DOCUMENTS

| | | | | |
|---|---|---|---|---|
| 5,509,626 | A * | 4/1996 | Fodor | E01B 7/02 246/443 |
| 9,823,164 | B2 * | 11/2017 | Dudeck | G01M 13/00 |
| 2005/0020402 | A1 | 1/2005 | Ny et al. | |
| 2012/0003073 | A1 | 1/2012 | Negre et al. | |
| 2012/0048656 | A1 | 3/2012 | West et al. | |
| 2014/0091188 | A1 | 4/2014 | Engelvin et al. | |

FOREIGN PATENT DOCUMENTS

| | | |
|---|---|---|
| CN | 103229067 A | 7/2013 |
| DE | 523726 A | 4/1931 |
| DE | 7022651 U | 4/1971 |
| DE | 202008002439 U1 | 8/2008 |
| DE | 102009020182 A1 | 11/2010 |
| DE | 102012211377 A1 | 1/2014 |
| RU | 3037 U1 | 10/1996 |

OTHER PUBLICATIONS

"WAMS—Komponenten"; hastema Bahntechnik Schulung; URL: http://www.transmetra.ch/images/storiess/pdf/sensorik/kraftsensoren/dokumente/a06.applikation_weichenantrieb.pdf; pp. 1-13; XP055094672; 2006.
PT 10K Multi: "Variabler Prüftisch für Weichenstellantriebe" Internet: http://www.probitron.de/fileadmin/pdf/datenblatt_multi .pdf; XP055094675; pp. 1-2.
"Weichenstellsysteme"; Richtungsweisende Technik von Hanning &Kahl; URL: http://www.hanning-kahl.de/fileadmin/huk/Inhalte/Abbildungen/Produkte_Service/Bahntechnik/Weichenstellsystem/Weichenstellsysteme_01 .pdf; pp. 1-16; XP055094669; 2010.
International Search Report for PCT Application No. PCT/EP2015/055545, dated Sep. 8, 2015.
Russian Office Action for application No. 2016143524, dated Feb. 19, 2018.
Chinese language Office Action for CN Application No. 201580017671.1, dated Apr. 27, 2018.

* cited by examiner

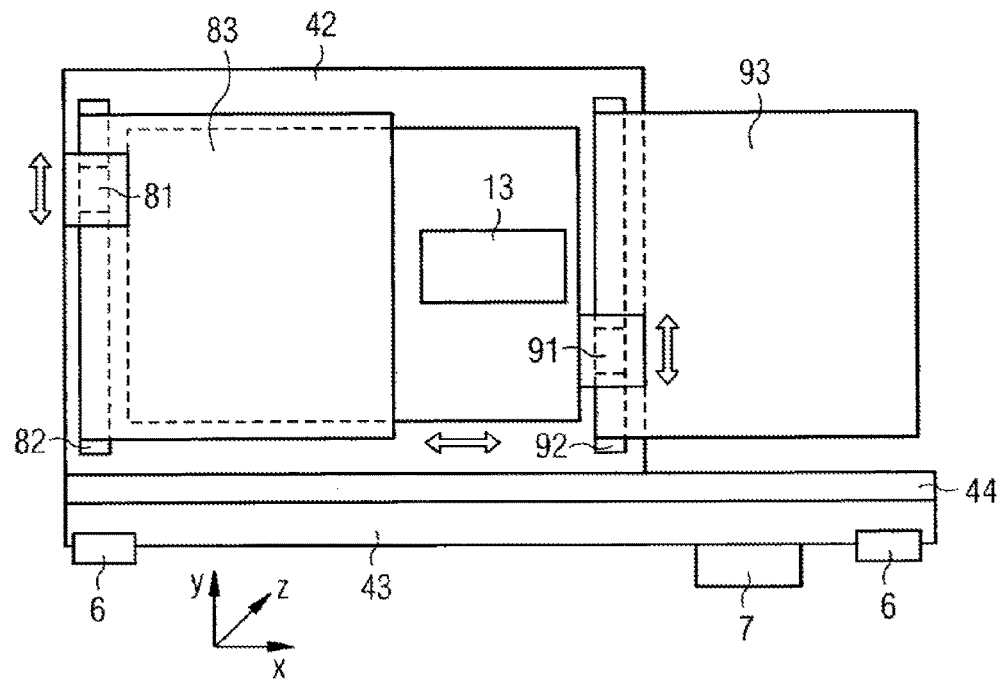
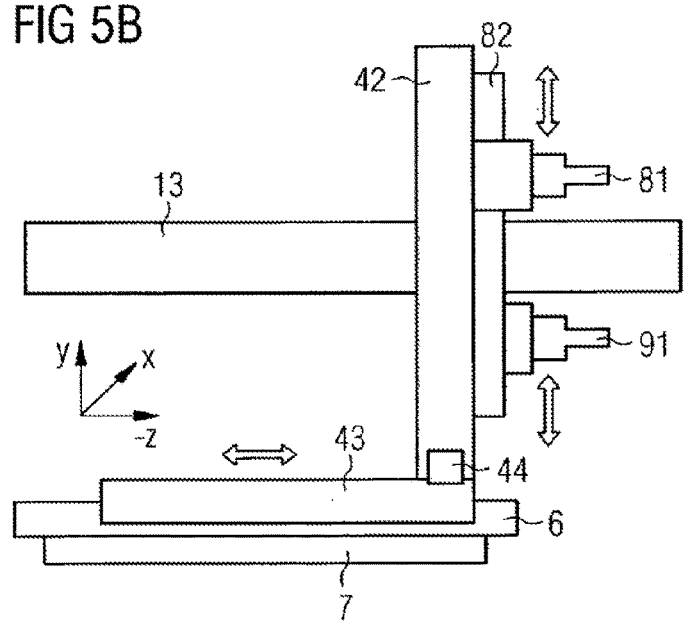

ARRANGEMENT, TEST RIG AND METHOD FOR TESTING A SWITCH MECHANISM FOR CHANGING OVER THE PATH TRAVELED BY A RAIL VEHICLE ON A TRACK

CROSS-REFERENCE TO RELATED APPLICATIONS

This application claims priority to PCT Application No. PCT/EP2015/055545, having a filing date of Mar. 17, 2015, based off of German application Nos. DE 102014206784.7 and DE 102014207457.6, having a filing date of Apr. 8, 2014 and Apr. 17, 2014, respectively, the entire contents of which are hereby incorporated by reference.

FIELD OF TECHNOLOGY

A switch mechanism serves for changing over the path traveled by a rail vehicle on a track. It usually consists of an electric motor, the rotational movement of which is converted into a linear movement by way of a spindle rod or toothed rack. Part of the mechanical system is usually also a coupling, which prevents excessive force from being exerted on the track.

BACKGROUND

In the course of the production or refurbishment of switch mechanisms, the forces generated by the switch mechanism must be definitively set and tested. One of the aims is that the forces generated by the switch mechanism do not go above or below certain upper and lower limits. For this purpose, opposing forces that correspond to the forces of the switch blade during later operation are applied to the switch mechanism acting as a test piece while it is performing actuating operations on the test rig.

The mechanical dimensions of the switch mechanisms differ very widely according to the area of use, manufacturer and development history. Externally, common to all switch mechanisms is the so-called actuating slider, which transfers the linear movement and force of the mechanism to the switch blade, and (optionally) so-called test sliders, which are likewise connected to the switch blade and make a mechanical indication of the position of the blade to the mechanism possible. For the testing, the switch mechanism is ideally fastened in the same way as it is later on the track (usually by way of a number of screw connections). On account of the different outer dimensions of the mechanisms, the two movable components are located at different positions in relation to the fastening points of the switch mechanism.

The document "PT 10K Multi: Variabler Prüftisch für Weichenstellantriebe" [PT 10K Multi: Variable test bench for switch actuating mechanisms], available on the Internet on Mar. 31, 2014 at http://www.probitron.de/fileadmin/pdf/datenblatt_multi.pdf, discloses a variable test bench for switch mechanisms that consists of a basic module and exchangeable test modules. The basic module has a hydraulic system as a force generator, a controller and also measuring and safety equipment. Available for different models of switch mechanisms are individual test modules, which according to the illustration respectively consist of a bench with rollers and position holders that are individually designed for the switch mechanism. The adaptation of the coupling point between the test piece and the test-rig force generator consequently takes place by mounting the test piece on a test module that is individually designed for the test piece.

A test slider mechanically indicates the actual position of the switch blade to the switch mechanism. For testing the test slider, it would have to be moved at the same time as the actuating slider. However, in this case the movement of the actuating slider and the test slider do not take place synchronously; the length of the displacement is also different. Therefore, the known art dispenses with complete testing of the switch mechanism including the test sliders, since the switch mechanism is tested without the test sliders fitted. The test sliders are only fitted after the test.

SUMMARY

An aspect relates to providing an arrangement that offers an alternative to the known art.

A further aspect is achieved according to the invention by an arrangement which has a horizontal component, which is mounted movably on at least one horizontal linear guide. The arrangement also comprises a vertical component, which is mounted perpendicularly on the horizontal component, is aligned transversely in relation to the horizontal linear guide and has a clearance which allows an object to be led through parallel to the horizontal linear guide.

The vertical component is set up to enter into a connection with a fastening foot at a plurality of coupling positions. The fastening foot is connected to test slider of a switch mechanism. An actuating slider of a switch mechanism or a component coupled to the actuating slider of the switch mechanism is led through the clearance in the vertical component.

The advantages mentioned below do not necessarily have to be achieved by the subjects of the independent patent claims. Rather, they may also be advantages that are merely achieved by individual embodiments, variants or developments.

The horizontal linear guide is for example designed as a parallel guide on both sides. It may be supplemented by a linear drive. In a development, the arrangement is suitable for the complete testing of a switch mechanism on a test rig. For this purpose, an actuating slider of the switch mechanism to be tested is led through the clearance in the vertical component of the arrangement. Furthermore, a test slider of the switch mechanism is connected to the vertical component of the arrangement. Since the horizontal component is movable as a carriage or car on the horizontal linear guide, a coupling position for the test slider can be freely chosen along its working direction. Furthermore, in this development the arrangement allows the actuating slider and the test slider to be moved independently of one another.

The fitting position or coupling position of the test slider can be varied by means of the development of the arrangement on the test rig. Independently of the displacement of the horizontal component in the longitudinal direction of the test slider, a plurality of coupling positions on the surface of the vertical component, that is to say consequently in the other two dimensions, are also possible. As a result, a coupling position for the test slider in three-dimensional space can be chosen. The arrangement consequently makes flexible adaptation of the test slider to the test rig possible. The switch mechanism can therefore be tested in the final state, since the test slider does not have to be removed in advance for the test on the test rig and only replaced again after the test. There is consequently no longer any need for separate testing of the test slider for its function and for its high-voltage resistance. Following the test, it is not necessary to perform any further steps on the switch mechanism.

The fastening foot offers the advantage that the test slider of a switch mechanism can be easily mounted on the vertical component. The coupling positions lie on a surface of the vertical component that is aligned perpendicularly in relation to the horizontal linear guide.

In a development, the vertical component is made of magnetizable material. The fastening foot is in this case a magnetic foot. This development offers the advantage that the magnetic foot can be fastened at virtually any desired positions on the vertical component with very great accuracy.

According to one embodiment, the vertical component is configured as a perforated plate, which allows screwing of the fastening foot. For example, the holes in the perforated plate are provided with a thread, so that the fastening foot is screwed directly in the perforated plate. Alternatively, a threaded rod of the fastening foot is led through one of the holes and fixed by a nut on the opposite side.

In a development, the vertical component is configured as a frame, which is movable transversely in relation to the horizontal linear guide on the horizontal component. Since, as a result of its structural form, the frame has a large rectangular clearance, this development makes particularly flexible leading-through of an actuating slider of a switch mechanism possible.

According to one embodiment, at least one side, in particular both sides, of the frame has/have a vertical guide, on which the fastening foot is movable. This makes it possible to dispense with screwing of the fastening foot and makes it possible for it to be set flexibly.

In a development, the fastening foot is movable on the vertical guide by manual displacement. For this purpose, the fastening foot is equipped with an operator control element, in particular a button. The arrangement is mechanically or electrically set up for releasing a clamping of the fastening foot to the frame and releasing a clamping of the frame to the horizontal component when the operator control element is actuated. Furthermore, the arrangement is mechanically and/or electrically set up for clamping the fastening foot to the frame and for clamping the frame to the horizontal component when the operator control element is actuated once more or the operator control element is let go.

This development offers the advantage that the fastening foot can be flexibly set in at least two dimensions on the frame with a single manipulation. The operator control element on the one hand makes one-handed release of the clamping of a vertical carriage and horizontal carriage on the respective guides possible and on the other hand makes tightening of the clamping after manual setting of the desired position possible.

According to one embodiment, the horizontal component has a linear drive, which is set up for the horizontal moving of the frame. The frame has at least one vertical linear drive, which is set up for the vertical moving of the fastening foot on the vertical guide. Furthermore, the arrangement includes a programmable controller, by means of which the fastening foot can be moved in an automated manner into pre-programmed coupling positions, dependent on types of switch mechanisms, by activation of the linear drives.

This embodiment offers the advantage that the fastening foot is movable in an automated manner into the respectively required coupling position.

In a development, the arrangement comprises a number of extension frames, which can be mounted on the left, the right or on top of the frame, and in particular with the extension frames being pre-mounted and able to fold away to the rear.

The arrangement allows the extension frames to be flexibly extended in two dimensions.

According to one embodiment, the arrangement includes an electronic display, which visually indicates one of the plurality of coupling positions. This embodiment assists the operator in finding the correct coupling position.

In a development, the electronic display is formed by LEDs which are inset in the vertical component at each of the coupling positions. Alternatively, the electronic display is formed by LEDs which are arranged at at least two edges of the vertical component in such a way that they visually indicate coordinates of the coupling positions. As a third alternative, the electronic display is a projection system, in particular a line laser or projector, which is set up for the projection of the coupling positions onto the vertical component. This development provides advantageous positioning aids for an operator.

According to one embodiment, the arrangement includes a circuit, in particular an electronic memory, from which the coupling positions, dependent on types of switch mechanisms, can be retrieved. The arrangement also includes a circuit or a computing unit, which is set up to activate the electronic display after input of a switch mechanism type in such a way that it displays the coupling position that is assigned to the switch mechanism type.

The arrangement is mounted on a test rig for the testing of a switch mechanism. Furthermore, the test rig has a force generator, which is set up to apply opposing forces to the switch mechanism while the switch mechanism is performing actuating operations on the test rig, whereby the test rig is set up for setting and/or testing forces that the switch mechanism generates. The force generator and the arrangement are mechanically and electrically independent of one another, so that a fastening foot can be positioned by means of the arrangement without influencing the test rig or the force generator, whereby a prescribed coupling position for the test slider of the switch mechanism can be set on the test rig.

This embodiment makes advantageous use of the arrangement on a test rig for switch mechanisms possible.

During the method for testing a switch mechanism, the arrangement is mounted on a test rig. On the basis of a type of a switch mechanism to be tested on the test rig, a prescribed coupling position for a test slider of the switch mechanism is determined by the arrangement. A fastening foot, which is pre-mounted on the arrangement, is moved to the prescribed coupling position. Alternatively, the fastening foot is mounted at the prescribed coupling position on the arrangement. Subsequently, the fastening foot is connected to a test slider of a switch mechanism. An actuating slider of the switch mechanism or a component coupled to the actuating slider of the switch mechanism is led through the clearance in the vertical component of the arrangement. Finally, the test rig applies opposing forces to the switch mechanism by way of a force generator while the switch mechanism is performing actuating operations on the test rig, with forces that the switch mechanism generates being set and/or tested.

The function of the test slider and its high-voltage resistance are of course advantageously also tested here.

The arrangement can be used for the adaptation of a test slider of a switch mechanism to a test rig.

BRIEF DESCRIPTION

Some of the embodiments will be described in detail, with reference to the following figures, wherein like designations denote like members, wherein:

FIG. 5A shows a front view of a frame for the flexible adaptation of a test slider of a switch mechanism;

FIG. 5B shows a side view of the frame from FIG. 5A;

In the figures, elements that are the same or functionally the same are provided with the same designations, unless otherwise indicated.

DETAILED DESCRIPTION

Figure 1:
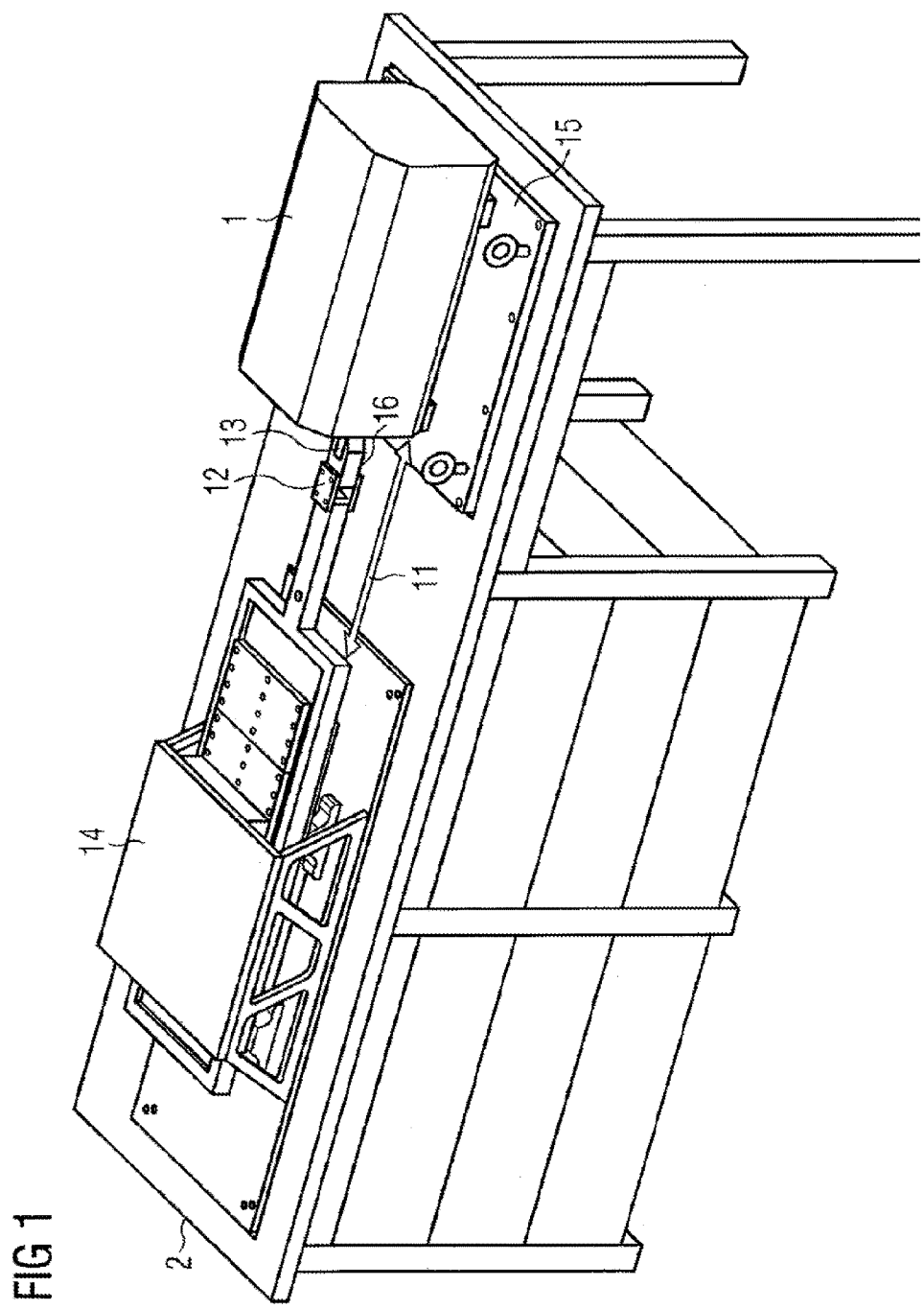
FIG. 1 shows a test rig for the inspection testing of a switch mechanism on which the test piece is securely screwed.

FIG. 1 shows a test piece 1, here a switch mechanism, which is fastened on an adapter plate 15, which is screwed on a test rig 2. An actuating slider 13 is driven by the test piece 1 in a direction of force and movement 11. The actuating slider 13 is coupled by way of a coupling point 16 to a force generator 14, whereby a force measurement 12 is made possible. The force generator 14 on the test rig is for example a hydraulic or electrical linear drive.

Figure 2:
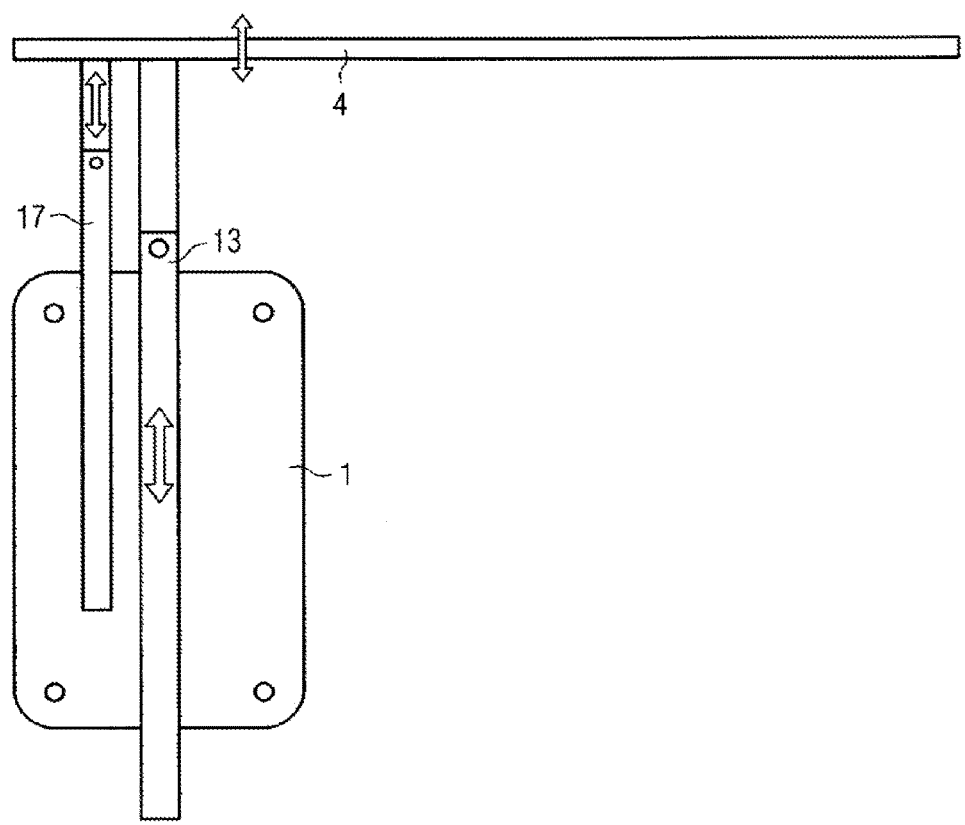
FIG. 2 shows a test slider and an actuating slider of a switch mechanism in interaction with a switch blade.

FIG. 2 shows a switch mechanism 1 in a way corresponding to its use on a track. By way of an actuating slider 13, the switch mechanism 1 moves a switch blade 4. A test slider 17 of the switch mechanism 1 determines here the actual position of the switch blade 4.

Figure 3A:
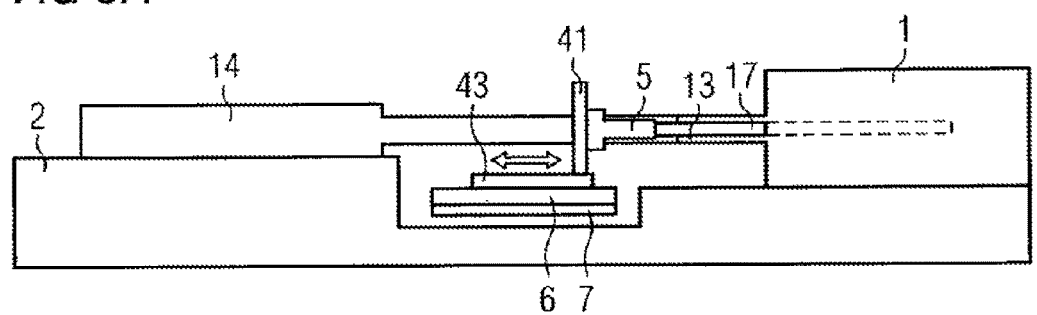
FIG. 3A shows a side view of a test rig for testing a switch mechanism with flexible adaptation of a test slider of the switch mechanism.

FIG. 3A shows a side view of a test rig 2 for the testing of a switch mechanism 1. For the servicing or inspection testing of the switch mechanism 1, a force generator 14 on the test rig 2 is coupled with an actuating slider 13 of the switch mechanism 1. In addition, the test slider 17 of the switch mechanism 1 is also intended to be included in the test piece on the test rig, so that it does not have to be fitted only after the test. Since the positions of the test slider 17 vary according to the model of the switch mechanism 1, the exemplary embodiment provides a plate 41, which is mounted vertically on a car 43, which in turn is guided on guides 6 and driven by way of a linear spindle 7. The test slider 17 is mounted on the plate 41 by means of a fastening foot 5. The side view of FIG. 3A shows here that a coupling position for the test slider 17 can be freely chosen in its direction of movement by means of moving the car 43 on the guide 6 by the linear spindle 7.

Figure 3B:
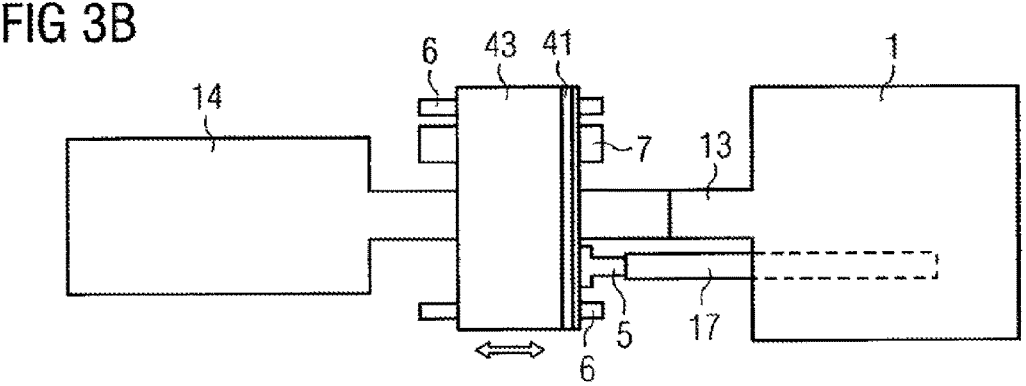
FIG. 3B shows a plan view of the test rig from FIG. 3A.

FIG. 3B shows a plan view of the exemplary embodiment from FIG. 3A. It can be seen from FIG. 3B that the coupling position of the test slider 17 on the plate 41 can also be freely chosen in the horizontally orthogonal direction in relation to the direction of travel of the car 43. For this purpose, the fastening foot 5 merely has to be mounted at a suitable position on the plate 41.

Figure 3C:
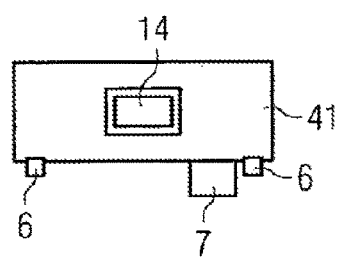
FIG. 3C shows a front view of the test rig from FIGS. 3A and 3B, which is taken as a section at the level of an arrangement for the flexible adaptation of a test slider.

FIG. 3C shows a front view of the exemplary embodiment from FIG. 3A and FIG. 3B, which is taken as a section at the level of the plate 41. The plate 41 has a clearance, through which an extension of the force generator 14, which is coupled with the actuating slider 13, is contactlessly led. The fastening foot for the test slider can be positioned relatively freely on the entire surface area of the plate 41. This also makes possible in particular different vertical positions for the fastening foot and the test slider.

Figure 4A:
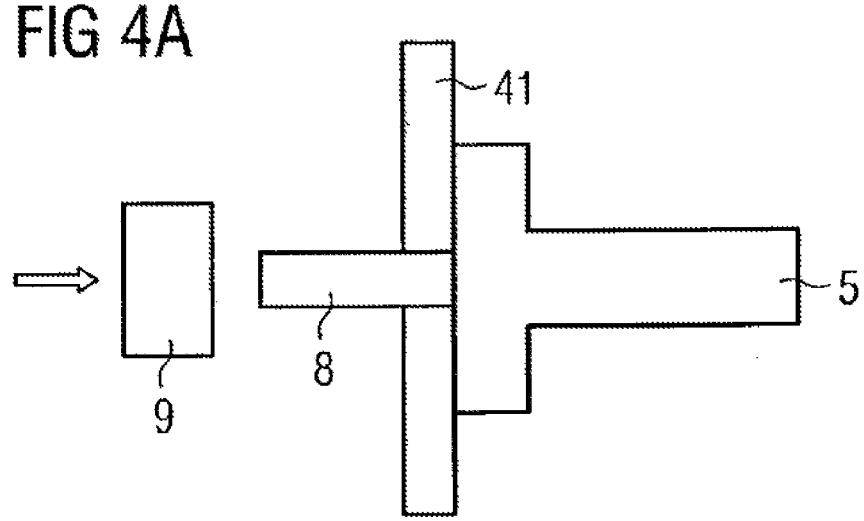
FIG. 4A shows a screw connection of a fastening foot on a perforated plate.

FIG. 4A shows a first alternative for the fastening of the fastening foot 5 on the plate 41. Here, the fastening foot 5 is screwed onto a threaded rod 8, which is inserted through the plate 41, here a perforated plate or perforated pattern plate, and fixed on the rear side by means of a nut. Alternatively, the plate 41 may also have threaded bores, in which the fastening foot 5 can be screwed directly.

Figure 4B:
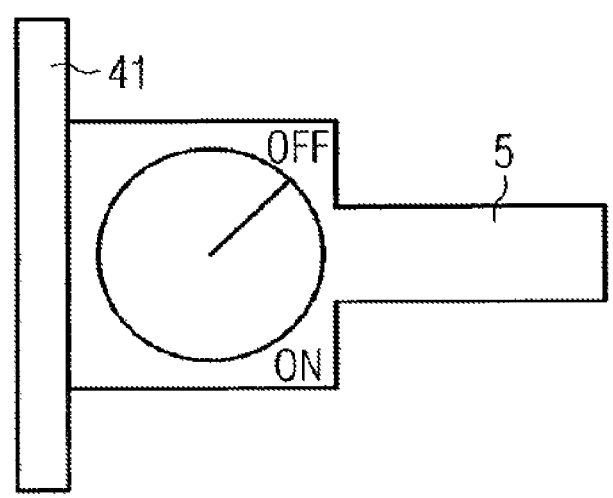
FIG. 4B shows a magnetic foot on a magnetizable plate.

FIG. 4B shows a second alternative, in which the fastening foot 5 is configured as a magnetic foot. The magnetic foot has here a rotary switch for switching the attachment effect on and off. Suitable magnetic feet are known, for example for magnetic stands for laboratory setups or for metal processing.

FIG. 5A shows a further exemplary embodiment for the flexible adaptation of the test slider. Once again this is based on a car 43, which is guided on guides 6 and driven by way of a linear spindle 7. The linear spindle 7 makes automatic positioning of the car 43 in the direction of movement of the test slider possible. Mounted on a horizontal guide 44 on the car 43 is a frame 42, which can be displaced transversely in relation to the direction of movement of the linear spindle 7 on the horizontal guide 44 and clamped. Since the frame 42 has a relatively large rectangular clearance, the actuating slider 13 or its coupling with the force generator 14 on the test rig 2 can be led contactlessly through the clearance in the frame 42. At the same time, it is ensured that during the displacement of the frame 42 on the horizontal guide 44 there is no contact with the actuating slider 13.

On the two side parts of the frame 42, a left-hand vertical guide 82 and a right-hand vertical guide 92 are mounted. Alternatively, the side parts of the frame 42 may also themselves be formed as a linear guide. Mounted on the left-hand vertical guide 82 is a left-hand adaptation 81, which can be displaced in the vertical direction and clamped. Correspondingly mounted on the right-hand vertical guide 92 is a right-hand adaptation 91, which can be displaced in the vertical direction and clamped. The left-hand adaptation 81 and the right-hand adaptation 91 here assume the function of the fastening foot from the previous exemplary embodiment, i.e. they serve for receiving the test slider. The horizontal freedom of movement of the frame 42 on the guide 44 and the vertical freedom of movement of the left-hand adaptation 81 on the left-hand vertical guide 82 produce a left-hand adaptation region 83, within which the left-hand adaptation 81 can be freely positioned. Correspondingly produced for the right-hand adaptation 91 is a right-hand adaptation region 93, in which the right-hand adaptation 91 can be freely positioned. According to the type of design of the switch mechanism, the left-hand adaptation 81 or the right-hand adaptation 91 is brought into the required coupling position and connected to the test slider of the switch mechanism.

FIG. 5B shows the exemplary embodiment from FIG. 5A in a side view. Instead of the manual setting possibilities described for the present exemplary embodiment, linear drives which are activated in an automated manner by way of a controller for adopting pre-programmed coupling positions may also be respectively used for the automated positioning of the adaptations 81, 91 and the frame 42.

Figure 6A:
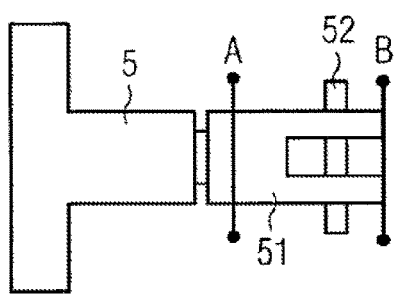
FIG. 6A shows a side view of a fastening foot for the adaptation of a test slider of a switch mechanism.

FIG. 6A shows the fastening foot 5 of FIGS. 3A, 3B, 3C, 4A and 4B and the left-hand adaptation 81 and the right-hand adaptation 91 from FIG. 5A and FIG. 5B in detail in a side view. The fastening foot 5 is equipped here with a receptacle 51, which can be differently configured according to the type of switch mechanism. In the exemplary embodiment shown, the receptacle 51 has a bolt 52, which serves for the securing of the test slider.

Figure 6B:
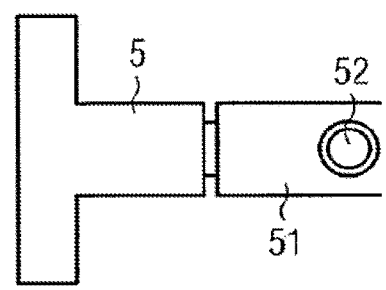
FIG. 6B shows a plan view of the fastening foot from FIG. 6A.

FIG. 6B shows a plan view of the exemplary embodiment from FIG. 6A. The receptacle 51 is rotatable by at least 90° with respect to the fastening foot 5.

Figure 6C:
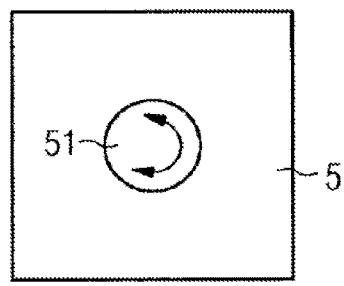
FIG. 6C shows a front view of the fastening foot from FIG. 6A, which has been taken as a section in plane A.

FIG. 6C shows a front view of the fastening foot from FIG. 6A, which is taken as a section in the plane A shown in FIG. 6A.

Figure 6D:
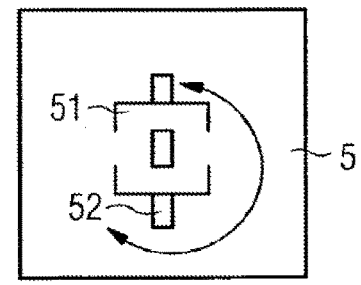
FIG. 6D shows a front view of the fastening foot from FIG. 6A, which has been taken as a section in plane B.

FIG. 6D shows a further front view of the fastening foot from FIG. 6A, which is taken as a section in the plane B shown in FIG. 6A.

Figure 7A:
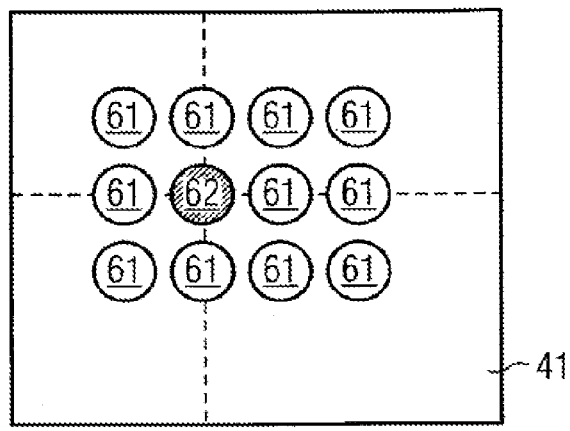
FIG. 7A shows LEDs which are inset in a plate and signal a suitable coupling position.

FIG. 7A shows the plate 41 from FIGS. 3A, 3B, 3C, 4A and 4B, in which LEDs 61 are inset. An illuminating LED 62 indicates to an operator the correct coupling position for the mounting of a fastening foot for a test slider of a switch mechanism. For this purpose, the type of switch mechanism to be tested is input, for example on a user interface of a computer. A computing unit takes from a memory the coupling position on the plate 41 that is assigned to the type and activates the LEDs 61 in such a way that the illuminating LED 62 at the coupling position lights up.

Figure 7B:
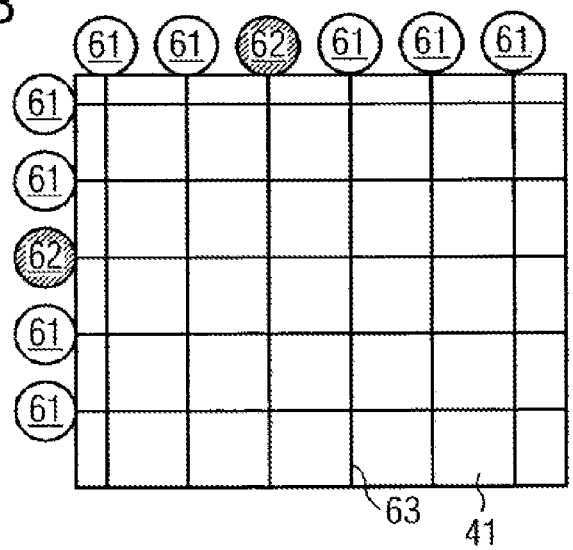
FIG. 7B shows LEDs which display at the edge of a plate coordinates for a suitable coupling position.

FIG. 7B shows an alternative exemplary embodiment, in which the LEDs 61 are arranged at the edge of the plate 41. Here, the illuminating LEDs 62 indicate coordinates for the correct coupling position of the fastening foot. To facilitate the positioning, fine lines may be engraved as a pattern of lines 63 in the plate 41.

Figure 7C:
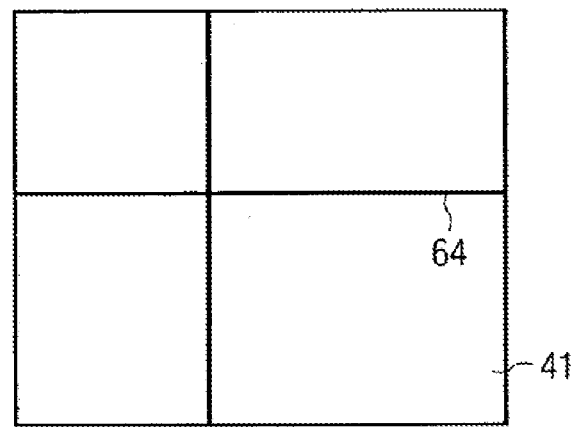
FIG. 7C shows a projected cross of a line laser on a plate.

FIG. 7C shows a third exemplary embodiment of the visual indication of the coupling position, in which a projected position marking 64, here a crosshair, of a line laser is projected onto the plate 41 in order to indicate the correct coupling position. Alternatively, a corresponding image may be projected onto the plate 41 by a projector.

Figure 8A:
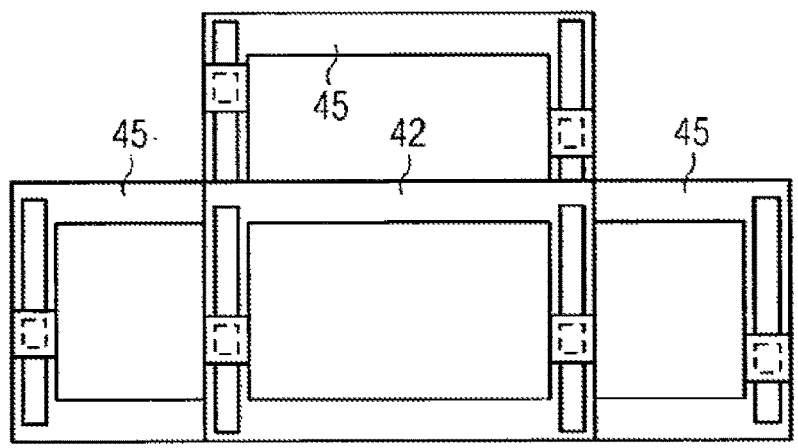
FIG. 8A shows a front view with three extension frames, which extend the frame from FIG. 5A and FIG. 5B.
Figure 8B:
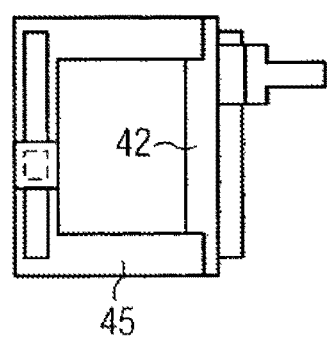
FIG. 8B shows a side view of the extension frames from FIG. 8A in a folded-in state.
Figure 8C:
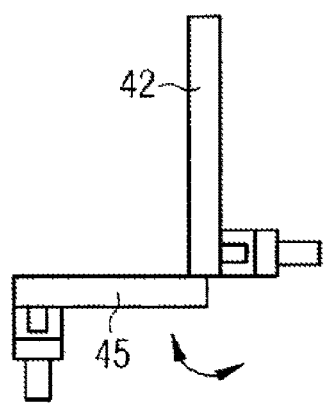
FIG. 8C shows a plan view of the extension frames of FIG. 8A in a folded-in state.

FIG. 8A shows a front view of three extension frames 45, which laterally and upwardly extend the frame 45 as it is explained here in the context of FIGS. 5A and 5B. As can be seen from FIG. 8A, each extension frame 45 is for its part equipped with guides and adaptations for the insertion of a test slider. The extension frames 45 may be temporarily attached to the frame 42 if the distance between the actuating slider and the test slider is greater than was envisaged by the original design of the frame 42. The extension frames 45 may however also be pre-mounted and able to fold away to the rear, as revealed by the side view in FIG. 8B and the plan view in FIG. 8C.

In principle, the adaptations 81, 91 shown in FIGS. 5A, 5B, 8A, 8B and 8C are advantageously provided with an ergonomically attached grip, which has a button or switch which in the depressed state mechanically or electrically releases a clamping of the adaptation 81, 91 to the frame 42 or to the extension frame 45. In addition, the clamping of the frame 42 on the car may also be released in this way, so that the adaptation 81, 91 can be guided in two dimensions into the required coupling position for the test slider. To supplement this, the clamping of the car on the horizontal linear guide can also be released here, so that the adaptation 81, 91 can be guided in three dimensions into the required coupling position for the test slider. When the button or switch of the adaptation is let go, clamping is immediately resumed, so that the adaptation 81, 91 remains in the chosen position.

The corresponding movements may however also be carried out in an automated manner by electrical linear spindles. The aforementioned linear spindles and linear drives are for example electrical or hydraulic linear drives, linear motors or linear actuators. Each of these linear spindles may also be replaced by manual setting devices for displacing and clamping on the respective linear guide.

The aforementioned guides and linear guides are for example linear sliding bearings, dovetail guides, profiled rail guides or cage rail guides.

The linear spindle 7 shown in FIGS. 3A, 3B, 3C, 5A and 5B, which drives the car 43, serves for simulating the switch blade movement on the test rig 2. The following statements relate to the corresponding exemplary embodiments. The movement carried out with the linear spindle 7 simulates the transverse movement of the switch blade on the track that is caused by the actuating slider 13. This movement takes place within the movement time period of the actuating slider 13, but is in principle independent of it. The movement of the actuating slider 13 not only serves for displacing the switch blade, but also releases in advance the locking of the switch blade (that is to say the element that keeps the switch blade in the respective end position) or closes it after reaching the end position. Therefore, the path of movement of the actuating slider 13 of the switch mechanism 1 is longer than the path of movement of the switch blade, and consequently of the test slider 17.

The position of the test slider 17 is only evaluated in the end positions, so that on the test rig 2 it only has to be ensured that the test slider 17 has been brought into the end position to be adopted in front of the actuating slider 13. The activation of the linear spindle 7 may be configured as a separate control program, which is called up by a general test program and then moves the test slider 17 into the pre-defined other end position. Alternatively, the movement of the linear spindle 7 may be controlled directly from a test program.

For executing the control programs and/or test programs, the test rig 2 has at least one suitable control unit, for example a programmable controller, a microprocessor or an electrical or electronic circuit.

Although the invention has been more specifically illustrated and described in detail by the exemplary embodiments, the invention is not restricted by the disclosed examples and other variations can be derived herefrom by a person skilled in the art without departing from the scope of protection of the invention. The described exemplary embodiments, variants, embodiments and developments can be freely combined with one another.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement, with a horizontal component, which is mounted movably on at least one horizontal linear guide, with a vertical component, which is mounted perpendicularly on the horizontal component, is aligned transversely in relation to the horizontal linear guide and has a clearance which allows an object to be led through parallel to the horizontal linear guide, in which the vertical component is set up to enter into a connection with a fastening foot at a plurality of coupling positions,
   in which the fastening foot is connected to a test slider of a switch mechanism, and in which an actuating slider of the switch mechanism or a component coupled to the actuating slider of the switch mechanism is led through the clearance in the vertical component.

2. The arrangement as claimed in claim 1,
   in which the vertical component is made of magnetizable material, and
   in which the fastening foot is a magnetic foot.

3. The arrangement as claimed in claim 1, in which the vertical component is configured as a perforated plate, which allows screwing of the fastening foot.

4. The arrangement as claimed in claim 1,
   in which the vertical component is configured as a frame, which is movable transversely in relation to the horizontal linear guide on the horizontal component.

5. The arrangement as claimed in claim 4,
   in which at least one side of the frame has a vertical guide, on which the fastening foot is movable.

6. The arrangement as claimed in claim 5,
   in which the fastening foot is movable on the vertical guide by manual displacement,
   in which for this purpose the fastening foot is equipped with an operator control element, in particular a button, which is at least one of mechanically and electrically set up for releasing a clamping of the fastening foot to the frame and releasing a clamping of the frame to the horizontal component when the operator control element is actuated, and
   which is at least one of mechanically and electrically set up for clamping the fastening foot to the frame and for clamping the frame to the horizontal component when the operator control element is actuated once more or the operator control element is let go.

7. The arrangement as claimed in claim 5,
   in which the horizontal component has a linear drive, which is set up for the horizontal moving of the frame,
   in which the frame has at least one vertical linear drive, which is set up for the vertical moving of the fastening foot on the vertical guide, and also
   in particular with a programmable controller, by means of which the fastening foot can be moved in an automated manner into pre-programmed coupling positions, dependent on types of switch mechanisms, by activation of the linear drives.

8. The arrangement as claimed in claim 4,
   with a number of extension frames, which can be mounted on a left side, a right side or on top of the frame, and in particular with the extension frames being pre-mounted and able to fold away to a rear side.

9. The arrangement as claimed in claim 1,
   with an electronic display, which visually indicates one of the plurality of coupling positions.

10. The arrangement as claimed in claim 9,
    in which the electronic display is formed by LEDs which are inset in the vertical component at each of the coupling positions, or
    in which the electronic display is formed by LEDs which are arranged at at least two edges of the vertical component in such a way that they visually indicate coordinates of the coupling positions, or
    in which the electronic display is a projection system, in particular a line laser or projector, which is set up for the projection of the coupling positions onto the vertical component.

11. The arrangement as claimed in claim 9,
    with a circuit, in particular an electronic memory, from which the coupling positions,
    dependent on types of switch mechanisms, can be retrieved, and
    with a circuit or a computing unit, which is set up to activate the electronic display after input of a switch mechanism type in such a way that it displays the coupling position that is assigned to the switch mechanism type.

12. The use of the arrangement as claimed in claim 1 for adaptation of a test slider of a switch mechanism to a test rig.

13. A test rig for testing of a switch mechanism,
    on which an arrangement is mounted,
    the test rig having a force generator, which is set up to apply opposing forces to the switch mechanism while the switch mechanism is performing actuating operations on the test rig,
    whereby the test rig is set up for at least one of setting and testing forces that the switch mechanism generates, and
    in which the force generator and the arrangement are mechanically and electrically independent of one another, so that a fastening foot can be positioned by the arrangement without influencing the test rig or the force generator, whereby a prescribed coupling position for a test slider of the switch mechanism can be set on the test rig.

14. A method for testing a switch mechanism,
    providing an arrangement mounted on a test rig, the arrangement having a vertical component with a clearance and a fastening foot,
    in which a prescribed coupling position for a test slider of the switch mechanism is determined based on the switch mechanism's type,
    in which the fastening foot, which is pre-mounted on the arrangement, is moved to the prescribed coupling position, or in which the fastening foot is mounted at the prescribed coupling position on the arrangement,
    in which the fastening foot is connected to the test slider of the switch mechanism,
    in which an actuating slider of the switch mechanism or a component coupled to the actuating slider of the switch mechanism is led through the clearance in the vertical component of the arrangement,
    in which the test rig applies opposing forces to the switch mechanism by way of a force generator while the switch mechanism is performing actuating operations on the test rig, and testing the forces that the switch mechanism generates.

* * * * *